United States Patent
Kuo et al.

(10) Patent No.: US 6,181,943 B1
(45) Date of Patent: Jan. 30, 2001

(54) METHOD AND APPARATUS FOR INTER-FREQUENCY HAND-OFF IN WIRELESS COMMUNICATION SYSTEMS

(75) Inventors: Wen-Yi Kuo, Parsippany; Martin Howard Meyers, Montclair; Carl Francis Weaver, Morris Plains, all of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/050,535

(22) Filed: Mar. 30, 1998

(51) Int. Cl.⁷ ...................................................... H04Q 7/38

(52) U.S. Cl. .................... 455/437; 455/439; 455/442; 455/443

(58) Field of Search ...................................... 455/437, 438, 455/436, 439, 443, 67.1, 68, 442; 370/331

(56) References Cited

U.S. PATENT DOCUMENTS

| | | | |
|---|---|---|---|
| 5,117,502 | * 5/1992 | Onoda et al. | 455/437 |
| 5,267,261 | 11/1993 | Blakeney, II . | |
| 5,323,446 | * 6/1994 | Kojima et al. | 455/437 |
| 5,471,670 | * 11/1995 | Hess et al. | 455/437 |
| 5,537,433 | 7/1996 | Persson et al. . | |
| 5,548,808 | 8/1996 | Bruckert et al. . | |
| 5,577,022 | 11/1996 | Padovani et al. . | |
| 5,590,177 | 12/1996 | Vilmur et al. . | |
| 5,634,192 | * 5/1997 | Meche et al. | 455/437 |
| 5,666,356 | 9/1997 | Fleming et al. . | |
| 5,995,836 | * 11/1999 | Wijk et al. | 455/437 |

FOREIGN PATENT DOCUMENTS

| | | |
|---|---|---|
| 2314734 | 1/1998 | (GB) . |
| WO9512297 | 5/1995 | (WO) . |
| WO9836607 | 8/1998 | (WO) . |

OTHER PUBLICATIONS

IS–95–B Standard for CDMA Communications, Section 7.6.6 and Section 6.6.6, Nov. 18, 1997.

Jain, P., Chen T. and Tiedeman, E., Proposed IS–95–B Text for Inter–frequency Hard Handoff Improvements, QualComm Incorporated, Mar. 17, 1997.

Tiedeman, E. and Chen, T., Proposed IS–95–B Text for Inter–frequency Hard Handoff Improvements, QualComm Incorporated, Mar. 20, 1997.

* cited by examiner

*Primary Examiner*—Nguyen Vo
*Assistant Examiner*—Lester G Kincaid
(74) *Attorney, Agent, or Firm*—Gibbon, Del Deo, Dolan, Griffinger & Vecchione (57) ABSTRACT

An apparatus and method which, in a wireless communication system, improve the quality of inter-frequency handoffs from an existing call connection frequency to a new frequency by minimizing oscillating inter-frequency handoffs between the existing call connection frequency and the new frequency, and by minimizing redundant and unnecessary tuning and searching at the new frequency. The present invention accomplishes this improvement by adding specific threshold comparison values (or triggers) within existing messages and through more robust data reporting, from the mobile unit to the base station, when tuning and searching is performed. Particularly, two comparative triggers provided by the present invention avoid unnecessary tuning and searching in the new frequency, thus reducing voice degradation and the risk of dropped calls while pilot searching in the current frequency. Additionally, an alternative embodiment of the present invention compares received power in the new frequency to the received power in the original frequency. If the received power in the new frequency does not exceed the received power in the original frequency by a specified hysteresis threshold value, then a search of the new frequency is unnecessary and the mobile unit "retunes" to the original frequency.

50 Claims, 3 Drawing Sheets

METHOD AND APPARATUS FOR INTER-FREQUENCY HAND-OFF IN WIRELESS COMMUNICATION SYSTEMS

FIELD OF THE INVENTION

This invention relates generally to wireless communication systems and, in particular, to techniques utilized for inter-frequency hand-offs.

BACKGROUND OF THE INVENTION

Wireless communication systems typically include a mobile switching center (MSC) and a plurality of base stations connected to the MSC. Each of the base stations provides wireless communication services to mobile stations within geographical coverage areas referred to herein as cells, wherein a mobile station is a transceiver to which a user or subscriber of the wireless communication system is associated. Associated with each wireless communication system are frequency spectrums over which user traffic may be transmitted between the base stations and the mobile stations. The amount of user traffic transmittable over a frequency spectrum is limited, in part, by the bandwidth of the frequency spectrum.

To more effectively utilize the frequency spectrum, wireless communication systems generally have incorporated multiple access techniques, such as frequency division multiple access (FDMA), time division multiple access (TDMA) and code division multiple access (CDMA). In FDMA and TDMA based systems, the frequency spectrum is partitioned into sets of narrow frequency bands (e.g., 30 kHz). In FDMA based systems, each narrow frequency band is used to define a traffic channel over which user traffic may be transmitted between a base station and a mobile station. In TDMA based systems, a traffic channel is defined by a narrow frequency band with time slots assigned for individual call connections. Thus, in TDMA based systems (as opposed to FDMA), more than one traffic channel may be defined using the same narrow frequency band. Typically, in FDMA and TDMA based wireless communication systems, base stations use distinct and unique narrow frequency bands to reduce co-channel interference.

In CDMA based wireless communication systems, the frequency spectrum typically includes only one wide frequency band, typically having a bandwidth of 1.25 MHz or wider. A traffic channel is defined, in part, by the wide frequency band and unique codes associated with individual users or subscribers. Although traffic channels in neighboring cells may use the same wide frequency band, co-channel interference (between base stations in neighboring cells) is reduced as a result of spreading gain attributable to the unique direct sequence codes which define the traffic channels. If the frequency spectrum is partitioned into two or more wide frequency bands, co-channel interference may further be reduced by using different wide frequency bands to define traffic channels in neighboring cells.

Regardless of the multiple access technique employed by the wireless communication system, a traffic channel needs to be assigned to a mobile station before any telephone call is placed by or to the mobile station. Specifically, the traffic channel is assigned to the mobile station by the base station associated with the cell in which the mobile station is physically located. As long as the mobile station stays within the same cell, the mobile station may use the same traffic channel for the duration of the telephone call. If the mobile station moves to another cell during the telephone call, a hand-off will be performed between the base station associated with the new cell and the base station associated with the old cell. Generally, hand-offs involve the mobile station detecting a strong RF signal from a new base station, the new base station assigning a new traffic channel to the mobile station, and the mobile station switching from the old traffic channel to the new traffic channel.

Hand-offs in which a mobile station switches between traffic channels defined using the same frequency band are referred to herein as intra-frequency hand-offs. Such hand-offs are utilized in CDMA based wireless communication systems in which the traffic channels involved in the hand-off are defined using the same wide frequency band. By contrast, hand-offs in which a mobile station switches between traffic channels utilizing different frequency bands are referred to herein as inter-frequency hand-offs. Inter-frequency hand-offs are utilized in FDMA and TDMA based wireless communication systems. Inter-frequency hand-offs may also be used in CDMA based wireless communication systems in which the traffic channels are defined utilizing more than one wide frequency band.

One concern associated with inter-frequency hand-offs is a tendency for the mobile station to oscillate between two frequencies. This occurs when a mobile station first hands-off to a new frequency and then subsequently returns to the old frequency. Such a situation is referred to herein as "ping-ponging." In geographical areas where the old and new frequencies are characterized as having strong RF signals, ping-ponging is a potential problem.

Another concern associated with inter-frequency hand-offs is dropped calls. Specifically, the success rate of inter-frequency hand-offs may suffer if the mobile station is unable, for a variety of reasons, to tune to the new frequency (used in defining the new traffic channel), thereby resulting in dropped calls. To resolve this problem in CDMA based wireless communication systems, new messages have been proposed for incorporation into the well-known IS-95 standard. The proposed new messages are described in a contribution entitled "Inter-frequency Hard Hand-off Improvements (Rev. 2)," to TR45.5, TR45.5.3.1/97.03.20.02, submitted on Mar. 20, 1997, by Edward Tiedemann and Tao Chen, and a contribution entitled "Proposed IS-95B Text for Inter-Frequency Hard Hand-off Improvements," to TR45.5, TR45.5/97.03.20.03, submitted on Mar. 17–21, 1997, by Pradeep Jain, et al.

The proposed new messages include fields that instruct a mobile station to perform a periodic search in a new frequency band for a strong RF signal whenever the mobile station nears the border of two or more cells and/or sectors. Performance of such a periodic search requires the mobile station to reallocate its resources and tune between the old frequency and the new frequency. Specifically, the mobile station may dedicate a periodic block of time to tune to the new frequency and perform its search for new base stations using the new frequency. This adversely affects the mobile station in two manners. First, while the mobile station is tuned to the new frequency, the mobile station cannot search for new base stations using the old frequency. Thus, the mobile station's search for new base stations in the old frequency is hindered. Second, fewer blocks of time are available for the transmission of user traffic (over the old frequency), which may result in a degradation of perceived communicated voice quality at the mobile station.

Therefore, there exists a need for improving inter-frequency hand-offs by minimizing oscillating inter-frequency hand-offs between existing and new frequencies, and by preventing unnecessary tuning to new frequencies to search for RF signals.

SUMMARY OF THE INVENTION

The present invention is a device and a method which, in a wireless communication system, improve the quality of inter-frequency hand-offs from an existing connection frequency to a new frequency by minimizing oscillating inter-frequency hand-offs between the existing connection frequency and the new frequency, and by minimizing redundant and unnecessary tuning and searching at the new frequency. Although the present invention is particularly well suited for application within a CDMA wireless communication system, and shall be so described herein, it is also equally applicable to other wireless communications systems requiring inter-frequency connection hand-offs, including FDMA and TDMA wireless communication systems.

The present invention accomplishes the noted inter-frequency hand-off improvements by adding specific threshold comparison values (or triggers) within existing messages and additionally via a more robust data reporting to the base station when tuning and searching is performed. Particularly, two comparative triggers provided by the present invention avoid unnecessary tuning and searching in the new frequency, thus reducing voice degradation and the risk of missing hand-off opportunities in the current frequency. Upon receiving an Extended Hand-off Direction Message (EHDM), a mobile unit (mobile station) will compare received power at the existing connection frequency with a threshold (or trigger) value (MIN_RX_PWR_CURR). An EHDM is a message from a base station to a mobile unit which includes a command to perform a hand-off if a new active set is given, and otherwise perform a search. If received power at the existing connection frequency is not greater than MIN_RX_PWR_CURR, then the mobile unit tunes to a new frequency to explore hand-off possibilities. However, if received power at the existing connection frequency is greater than MIN_RX_PWR_CURR, then a second comparative trigger is utilized. The second comparative trigger compares the summation of fractional pilot power from all active pilots with a threshold (or trigger) value (MIN_SUM_ECIO_CURR). If the summation of fractional pilot power from all active pilots is less than or equal to MIN_SUM_ECIO_CURR, then the mobile unit tunes to the new frequency to explore hand-off possibilities. However, if the summation of fractional pilot power from all active pilots is greater than MIN_SUM_ECIO_CURR, then the mobile unit continues the call at the original frequency and reports conditions to the base station.

Additionally, an alternative embodiment of the present invention compares received power in the new frequency to the received power in the original frequency. If the received power in the new frequency does not exceed the received power in the original frequency by a specified hysteresis threshold value (HYSTERESIS_RX_PWR), then a search of the new frequency is unnecessary and the mobile unit "retunes" to the original frequency.

Advantageously, the cumulative effect of the above recited contributions of the present invention is a reduction in the quantity of dropped calls during inter-frequency hand-off, a minimization of voice degradation, and an improvement in the search speed utilized for a soft hand-off in the current frequency.

Minimization of oscillatory hand-offs to a new frequency with a subsequent return to the original frequency (or "ping-ponging") is accomplished by incorporating a more robust reporting scheme (of RF conditions) from a mobile unit to the base station. Specifically, embodiments of the present invention utilize mobile unit reporting of not just received power and fractional pilot power from pilots at the new frequency, but also of received power and fractional pilot power from pilots at the current frequency as well, Mobile unit reporting of RF conditions to the base station is accomplished via fields included within an Other Frequency Report Message (OFRM). Although the fractional pilot power in the current frequency may be accomplished by invoking a Pilot Measure Request Order(PMRO), doing so creates a greater messaging density and a greater burden on the mobile unit. Utilization of the previously summarized hysteresis comparison value also aids in the minimization of "ping-ponging" events.

BRIEF DESCRIPTION OF THE DRAWINGS

A more complete understanding of the present invention may be obtained from consideration of the following description in conjunction with the drawings in which.

DETAILED DESCRIPTION

Figure 1:
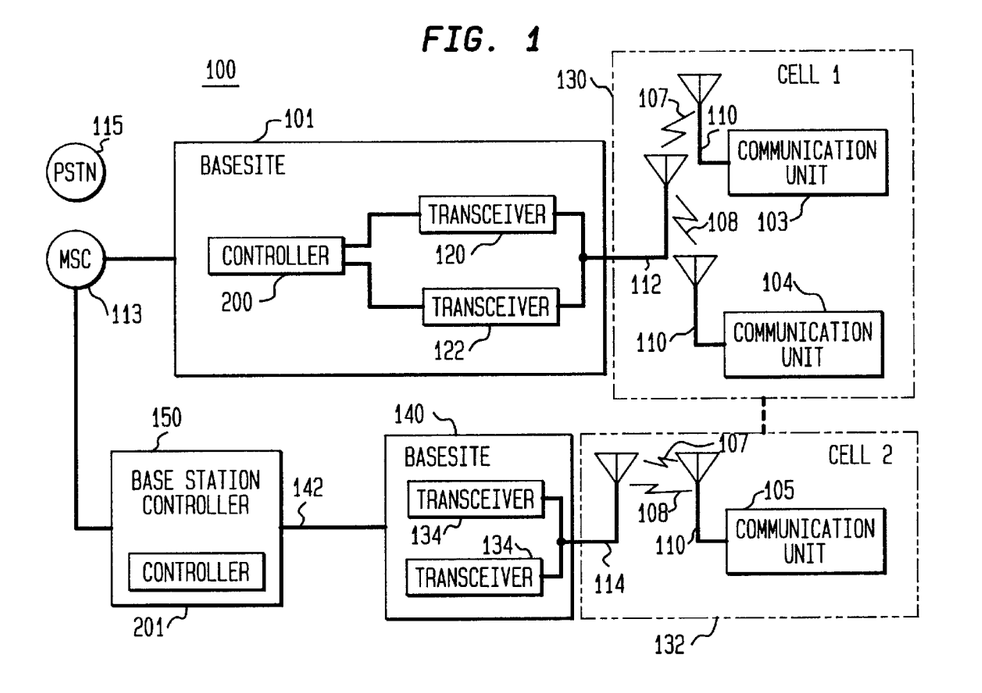
FIG. 1 is a block diagram illustrating a CDMA communication system.

Although the present invention is particularly well suited for use within a CDMA communication system and is so described with respect to this application, it is also applicable for use in conjunction with other wireless communication systems. FIG. 1 illustrates a communication system 100 including a first base site 101, a second base site 140, and one or more communication units 103,104,105 (i.e., mobile stations or mobile units). An exemplary embodiment of communication system 100 is a code division multiple access CDMA cellular communication system, such as that set forth in the Telecommunications Industry Association/Electronic Industries Association Interim Standard 95 (TIA/ETA IS-95; hereinafter referred to as IS-95). In the cellular communication system 100, the base site 101 is coupled to a mobile switching center (MSC) 113 that is in turn coupled to a public switched telephone network (PSTN) 115 using known techniques.

The base site 101 preferably includes a plurality of transceivers 120 and 122 (only two shown) that receive coded communication signals from the communication units 103,104 within a coverage area defined by a first cell 130 of the base site 101 and transmits coded communication signals to the communication units 103,104 within the first cell 130. The base site 101 also includes appropriate interfaces between the MSC 113, the transceivers 120,122, and an antenna 112. In addition, the base site 101 includes a controller 200. Each of the communication units 103,104, 105 comprises a mobile station or unit with radio frequency (RF) transmission and reception capabilities. Each of the communication units has an antenna 110 attached thereto. The base site 140 is substantially similar to base site 101 except that base site 140 communicates with a controller 201 via a communication link 142 since the controller 201 is within a base station controller 150 that is in turn connected to the MSC 113. Base site 140 has an antenna 114 and has a coverage area defined by a second cell 132.

Within the exemplary CDMA system 100, coded communication signals comprise CDMA communication signals 107,108 that are conveyed between the communication units 103,104,105 and the base sites 101,140 through an uplink (from communication unit to base site) RF carrier and a downlink (from base site to communication unit) RF carrier within each cell 130,132. The RF channel includes an uplink (communication units 103,104 to base site 101) and a downlink (base site 101 to communication units 103,104). In a one embodiment of the present invention, the downlink and uplink RF carriers have associated prescribed bandwidths (e.g., 1.25 MHz for IS-95) collectively used by the communication units 103,104 to transmit multiple coded communication signals 107,108 (CDMA signals in this case) toward the base site 101 and vice versa. Each CDMA communication signal 107,108 is defined by, inter alia, a pseudo-noise sequence, a timing offset associated with the base site 101, a Walsh code, and an identification code for the particular communication unit 103,104.

Figure 2:
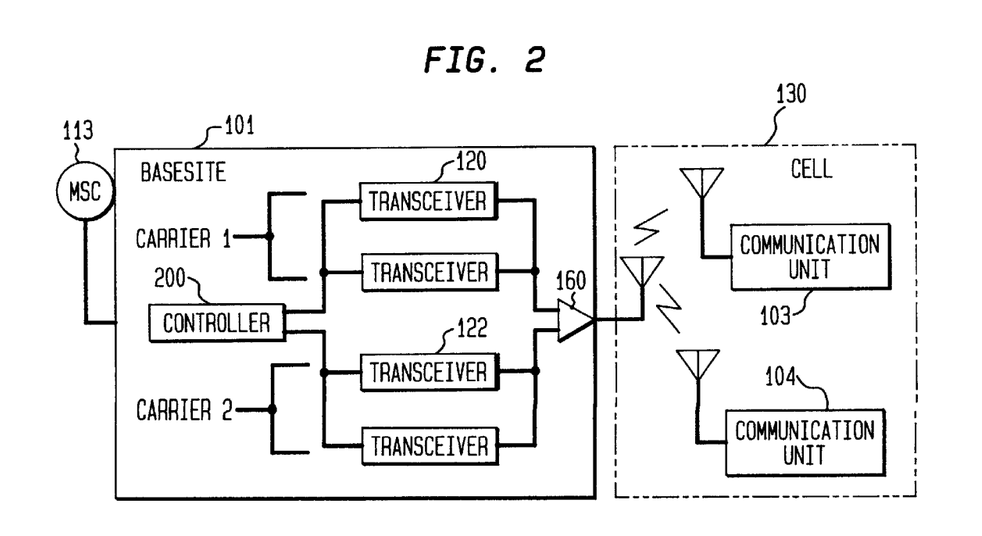
FIG. 2 is a block diagram illustrating a multicarrier CDMA communication system.

In one alternative embodiment the CDMA system may be a multicarrier system. Each base site 101,140 in the multicarrier CDMA system 100 has an associated plurality of RF carriers. Multiple carriers allow for more traffic channels which increases the capacity of the CDMA system. Each carrier has associated prescribed bandwidths (e.g., 1.25 MHz for IS-95) for uplink (communication unit 103 to base site 101) and downlink (base site 101 to communication unit 103). At a call origination, the call is assigned to one of the traffic channels available in the cell of origination. A particular embodiment of the multicarrier system is illustrated in FIG. 2. Differences between the multicarrier embodiment of FIG. 2 and the embodiment of a single carrier system illustrated in FIG. 1 are as follows. Communication units 103,104 in the multicarrier CDMA system have the capability to use different frequency bands, corresponding to different carriers, for transmitting and receiving. In the forward direction, radio signals corresponding to different carriers are combined by a combiner 160 before they are transmitted by the antenna. In the reverse direction, the radio signal received by the antenna is filtered into signals corresponding to different carriers. FIG. 2 shows different groups of transceivers 120,122 processing signals of different carriers. Modifications of the particular embodiment of a multicarrier system, described above, are also possible. For example, the transceivers 120,122 do not have to be "dedicated" to specific carriers but can be shared by the carriers. Further detail of a suitable multicarrier system is described in the IS-95B standard.

When the mobile unit is engaged in a call, the mobile unit may use the same traffic channel for the duration of the connection, as long as it remains within the same cell. If, however, the mobile unit moves to another cell during the connection, a hand-off will be performed between the servicing (primary) base station in control of the mobile unit and the base station of the new cell. Hand-offs in which a mobile unit switches between traffic channels defined using the same frequency band are referred to as intra-frequency hand-offs. Hand-offs in which a mobile unit switches between traffic channels defined using different frequency bands are referred to as inter-frequency hand-offs. A description of an improved method for mobile unit inter-frequency hand-off within a CDMA based wireless communication system follows. However, as previously stated, the present invention is equally applicable when used in conjunction with other wireless communication systems, such as TDMA or FDMA based systems.

Several new messages have been proposed for incorporation within IS-95B to aid in CDMA based system hand-offs in a contribution entitled "Inter-frequency Hard Handoff Improvements (Rev. 2)," to TR45.5, TR45.5.3.1/97.03.20.02, submitted on Mar. 20, 1997, by Edward Tiedemann and Tao Chen, and a contribution entitled "Proposed IS-95B Text for Inter-Frequency Hard Hand-off Improvements," to TR45.5, TR45.5/97.03.20.03, submitted on Mar. 17–21, 1997, by Pradeep Jain, et al. The new proposed messages include an Other Frequency Neighbor List Message (OFNLM), an Other Frequency Neighbor List Response Message (OFNLRM), an Other Frequency Report Message (OFRM), and a modified Extended Hand-off Direction Message (EHDM), as will be described herein. The present invention incorporates additional checks and messages, as well as additional fields within existing and proposed messages, to further improve inter-frequency hand-off performance.

Figure 3A:
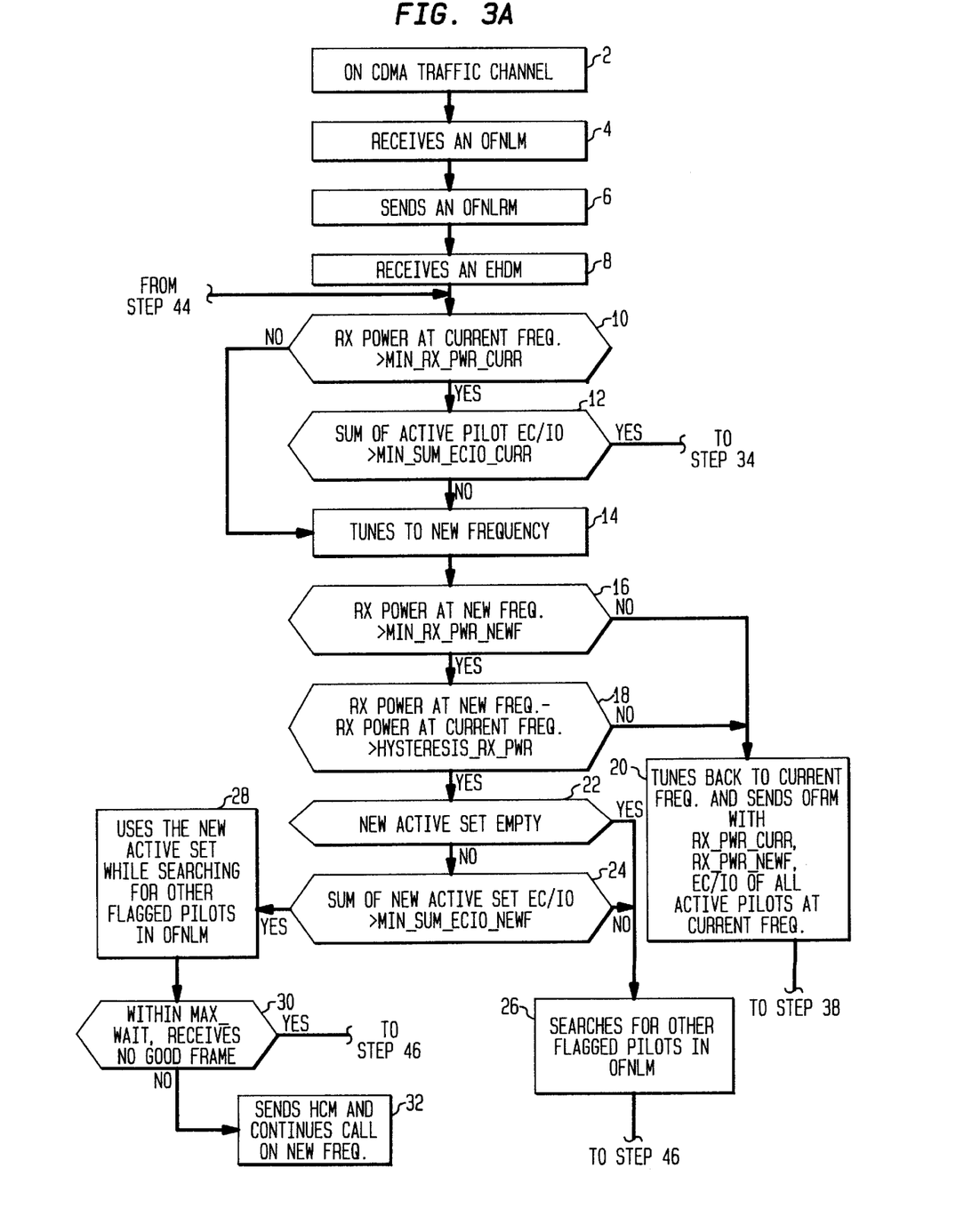
FIGS. 3a and 3b are flow charts illustrating the process steps for an improved inter-frequency hand-off trigger and reporting system, in accordance with the present invention.
Figure 3B:
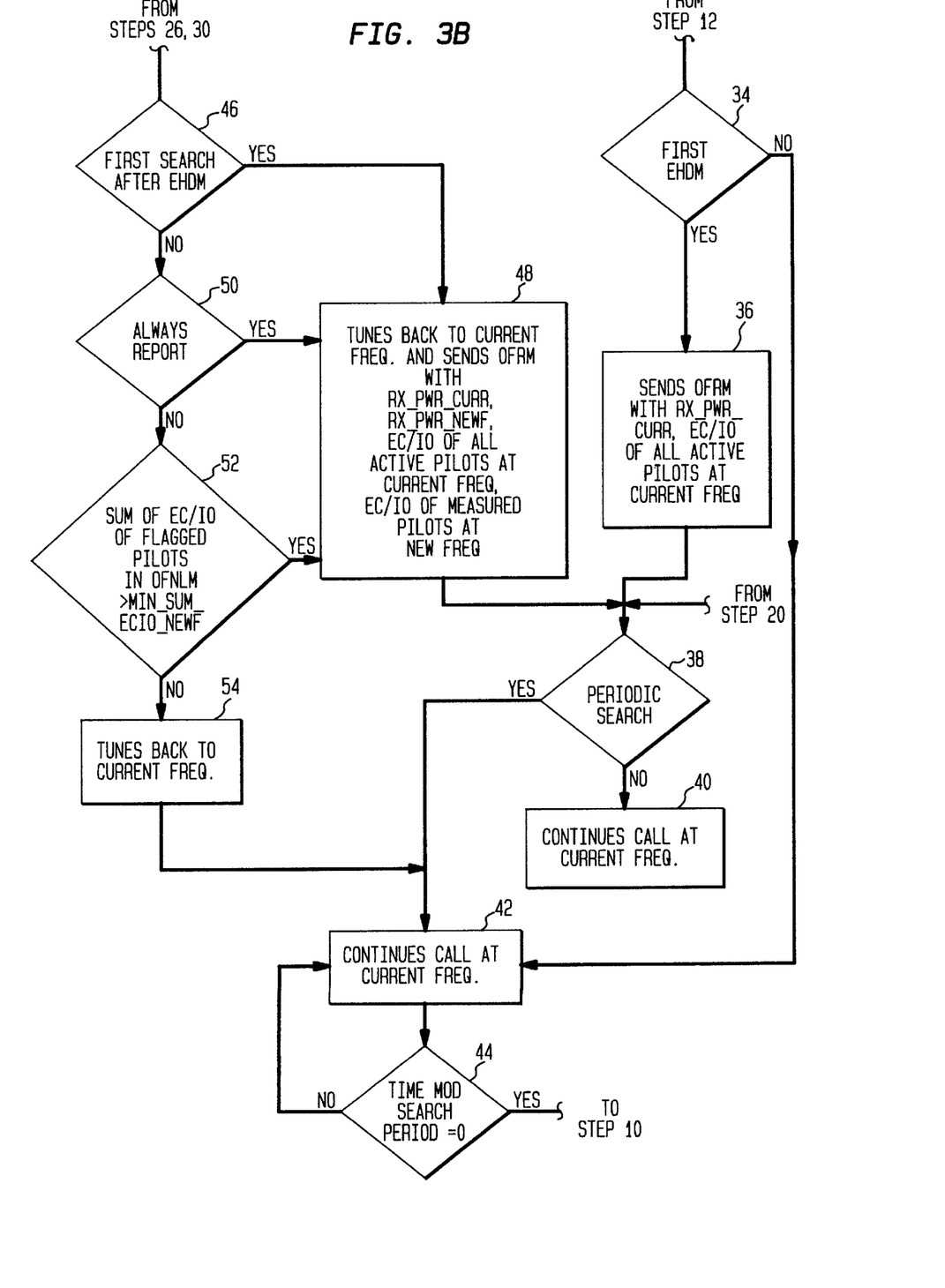

FIGS. 3a and 3b are flow charts illustrating the process steps for an improved inter-frequency hand-off trigger and reporting system incorporated within a wireless communication system 100. The system typically comprising the controller 200,201 at the base site (or base station) 101,140 and a plurality of communication units (or mobile units) 103,104,105. At least one mobile unit maintains an established CDMA signal call connection over a traffic channel with a servicing base station, in accordance with step 2. A mobile having an established call connection with a servicing base station is in possession of the corresponding cell's Serving Frequency Neighbor List. The Serving Frequency Neighbor List is a list indicating pilot channel codes (a unique and distinguishable timing offset for each pilot channel) of the serving or current frequency (that frequency over which a particular connection is currently maintained) for neighboring base stations which are potential hand-off recipients. The servicing base station transmits an OFNLM to the mobile unit once the servicing base station determines that there is a possible need for handing off a mobile unit to a new frequency, in accordance with step 4. The servicing base station makes this determination, in accordance with IS-95B, by monitoring, inter alia, the distance between the mobile unit and the base station, the quality of both forward and reverse links, the forward traffic channel gain, and the detection of a pilot channel signal by the mobile unit. An OFNLM is equivalent to the IS-95B (Nov. 18, 1997 version) proposed message, Candidate Frequency Search Request Message (CFSREQM).

The OFNLM contains a Candidate Frequency Neighbor List (CFNL). The CFNL is a list indicating pilot channel codes for prospective hand-off frequencies associated with base stations which are potential hand-off recipients. In addition to the CFNL, the OFNLM contains the search window sizes for the base station sectors on new CDMA channels which are potential handoff destinations for the mobile. The mobile unit responds to a received OFNLM by transmitting an OFNLRM back to the originating or servicing base station, in accordance with step 6. The OFNLRM is a message utilized to confirm reception of the OFNLM. In one embodiment of the present invention, the OFNLRM message is equivalent to the IS-95B (Nov. 18, 1997 version) proposed message, Candidate Frequency Search Response Message (CFSRESM).

The base station then transmits an EHDM to the mobile unit, in accordance with step 8. The EHDM is a command from the base station to the mobile unit to perform a hand-off if a new active set is provided (subsequently described), otherwise it is a command for the mobile unit to commence a search for pilot channel signals at a current frequency having a received strength (received power at the mobile unit) greater than a specified threshold value, as will be explained herein. The EHDM is equivalent to the IS-95B (Nov. 18, 1997 version) proposed message known as a General Handoff Direction Message (GHDM).

For purposes of this application, a current or old active set refers to a list indicating base stations which the mobile unit is in communication with at the current frequency (i.e., the frequency used by the servicing base station). The current or old active set includes at least the servicing or primary base station. A new active set refers to a list indicating base stations which the mobile unit is in communication with at a new frequency. An active set (old or new) is considered "empty" if no base stations are indicated. Additionally, for purposes of this application a pilot channel signal is defined herein as an unmodulated signal (i.e., a beacon signal containing no modulated data) transmitted over a pilot channel. All pilot channel signals in an IS-95 CDMA system are defined using the same spreading sequence and Walsh code, but are differentiated since each pilot channel signal has a unique and distinguishable timing offset value.

Referring back to FIG. 3a, the mobile unit performs a conditional check in accordance with step 10; that is, the received power of signals at the current frequency (i.e., frequency used by the servicing base station) is compared to a threshold value (MIN_RX_PWR_CURR). If received power at the current frequency is less than or equal to MIN_RX_PWR_CURR, then the mobile unit tunes to a new frequency indicated by the OFNLM, in accordance with step 14, to explore a potential hand-off opportunity at the new frequency. However, if the received power at the current frequency is greater than MIN_RX_PWR_CURR, then a second conditional check is performed in accordance with step 12. In one embodiment of the present invention, the threshold value MIN_RX_PWR_CURR is equivalent to the IS-95B (Nov. 18, 1997 version) proposed threshold value of SF_RX_PWR_THRESH.

In accordance with step 12, the mobile unit compares the sum of each Ec/Io for all current active set pilot channel signals (i.e., pilot channel signals transmitted by base stations indicated in the current active set) to a minimum threshold value for the current frequency (MIN_SUM_ECIO_CURR). Ec/Io is the relative signal strength, or the fractional total power received over a particular pilot channel (i.e., from a particular base station), where Ec represents energy per chip and Io represents total received power. If the sum of each Ec/Io for all current active set pilot channel signals is less than or equal to MIN_SUM_ECIO_CURR, then the mobile unit tunes to a new frequency, as indicated in the OFNLM and in accordance with step 14, to explore a potential hand-off opportunity at the new frequency.

However, if the sum of each Ec/Io for all current active set pilot channel signals is greater than MIN_SUM_ECIO_CURR, then the connection between mobile unit and base station is characterized as being acceptable and the mobile unit proceeds to step 34 and does not tune to the new frequency. In step 34, as shown in FIG. 3b, if the received EHDM is the first received EHDM for a proposed inter-frequency hand-off, then the mobile unit proceeds to step 36 where it transmits an OFRM to the servicing base station. In one embodiment of the present invention, the OFRM is equivalent to the IS-95B (Nov. 18, 1997 version) proposed message known as a Candidate Frequency Search Report Message (CFSREPM). The OFRM includes an updated report to the servicing base station of the status of Ec/Io of all current active set pilot channel signals at the current frequency and RX_PWR_CURR of the current frequency, wherein RX_PWR_CURR is a field indicating the value of received power for the current frequency. In one embodiment of the present invention, RX_PWR_CURR is equivalent to the IS-95B (Nov. 18, 1997 version) proposed message of SF_TOTAL_RX_PWR. If the EHDM received is not the first received EHDM for a proposed inter-frequency hand-off, then the mobile continues the connection at the current frequency, in accordance with step 42.

Returning now to step 14, either the comparison performed in step 10 or step 12 returned a negative result (indicating a poor RF signal condition at the current frequency), and therefore the mobile tuned to a new frequency to explore a potential hand-off opportunity. First, in accordance with step 16, received power of signals at the new frequency is compared to a threshold comparison value (MIN_RX_PWR_NEWF). In one embodiment of the present invention, the threshold comparison value MIN_RX_PWR_NEWF is equivalent to the IS-95B (Nov. 18, 1997 version) proposed threshold comparison value of CF_RX_PWR_THRESH.

If received power at the new frequency is not greater than MIN_RX_PWR_NEWF, then the RF condition of the new frequency is not acceptable, and in accordance with step 20, the mobile unit tunes back to the original frequency (i.e., servicing frequency) and sends an OFRM containing the following fields: RX_PWR_CURR, RX_PWR_NEWF, and Ec/Io for all active set pilot channel signals at the original frequency. In one embodiment of the present invention RX_PWR_NEWF represents the value of received power at the new frequency; and RX_PWR_NEWF is equivalent to the IS-95B (Nov. 18, 1997 version) proposed message of CF_TOTAL_RX_PWR. However, if received power at the new frequency is greater than MIN_RX_PWR_NEWF, then the RF condition of the new frequency is acceptable, in accordance with step 16.

Advantageously, an exemplary embodiment of the present invention utilizes a hysteresis comparison to prevent oscillatory tuning to a new frequency with a subsequent return to the original frequency ("ping-ponging"). In step 18, the difference between received power at the new frequency and received power at the original frequency is compared to a threshold value (HYSTERESIS_RX_PWR). In one embodiment of the present invention, HYSTERESIS_RX_PWR is equivalent to the IS-95B (Nov. 18, 1997 version) proposed threshold value of DIFF_RX_PWR_THRESH.

If received power at the new frequency does not exceed received power at the original frequency by at least HYSTERESIS_RX_PWR, then in accordance with step 20, the mobile unit tunes back to the original frequency and sends an OFRM containing the following fields: RX_PWR_CURR, RX_PWR_NEWF, and Ec/Io for all active set pilot channel signals at the original frequency.

However, if received power at the new frequency does exceed received power at the original frequency by at least HYSTERESIS_RX_PWR, then in accordance with step 22, the mobile unit checks to see whether the new active set is empty. As previously described, an empty new active set is a list indicating no base stations at the new frequency. If the new active set is empty, the mobile unit will proceed to step 26 and perform a search in at a new frequency band for pilot channel signals having a received strength (received power at the mobile unit) greater than a specified threshold value. If the new active set is not empty, then the base station directs the mobile unit to one or more base stations indicated in the new active set at the new frequency. In step 24, a conditional check is performed. If the sum of the Ec/Io for new active set pilot channel signals is not greater than a threshold value (MIN_SUM_ECIO_NEWF), in accordance with step 24, then the mobile unit searches for other pilot channel signals at frequencies indicated by the OFNLM, in accordance with step 26. The process then resumes at step 46.

If the sum of Ec/Io for the new active set pilot channel signals is greater than MIN_SUM_ECIO_NEWF, then the mobile unit utilizes the new active set while searching for other pilot channel signals included within the OFNLM, in accordance with step 28. Step 30 is an inquiry as to whether cyclical redundancy code (CRC) checks result in returning no acceptable frames (i.e., frames without errors) within a prescribed time period (MAX_WAIT). If an acceptable frame is received within MAX_WAIT, then a hand-off completion message (HCM) is transmitted from the mobile unit to the new base station (at the new frequency) indicating that a successful hand-off is complete and the connected call continues at the new frequency, in accordance with step 32. However, if an acceptable frame is not received within MAX_WAIT, the process resumes with step 46.

Step 46 represents an inquiry as to whether the search performed is a first search after receiving an EHDM. If the search is the first search, then process step 48 is performed. If the search is a search subsequent to the first search, then step 50 is performed. If the reporting scheme is configured such that performance of any search is to be reported in an OFRM, then step 48 is performed, otherwise, step 52 is next performed. Step 52 compares the sum of Ec/Io for OFNLM pilot channels to MIN_SUM_ECIO_NEWF. If the sum of Ec/Io for OFNLM pilot channels is greater than MIN_SUM_ECIO_NEWF, then step 48 is performed. If the sum of Ec/Io for OFNLM pilot channels is not greater than MIN_SUM_ECIO_NEWF, then the mobile unit is redirected to its original frequency, in accordance with step 54. The call is then continued at its original frequency in accordance with step 42.

In step 48, the mobile unit returns to its original frequency and sends an OFRM to the base station. The OFRM sent in accordance with step 48 includes the following information/fields: RX_PWR_CURR, RX_PWR_NEWF, the Ec/Io of all active pilots of the original frequency, and the Ec/Io of the measured pilots of the searched frequency. In accordance with step 38, if an embodiment of the present invention is utilized which is not configured to perform periodic searches, then the call continues at the original frequency, in accordance with step 40. If an embodiment of the present invention is utilized which is configured to perform periodic searches, the call similarly continues at the original frequency, in accordance with step 42. However, whenever a specified search period expires, in accordance with step 44, the process is redirected to begin anew at step 10.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

What is claimed is:

1. In a wireless communication system having a base station in communication with a mobile unit at a first frequency, a method for inter-frequency hand-off of a connected call to a new frequency, said method comprising the steps of:

comparing, at said mobile unit, a received power at said first frequency to a received power threshold value;

tuning said mobile unit to said new frequency to explore said new frequency for a potential hand-off opportunity when said received power at said first frequency is less than said received power threshold value wherein said connected call is continued at said first frequency if said received power at said first frequency is greater than said received power threshold value;

comparing a summation of active pilot channels' fractional total power to a pilot power threshold value of said continued connected call, wherein said mobile unit continues said connected call at said first frequency when said summation of active pilot channels' fractional total power is greater than said pilot power threshold value; and tuning to said new frequency to explore said new frequency for a potential hand-off opportunity when said received power at said first frequency is less than said received power threshold value or said summation of active pilot channels' fractional total power is less than said pilot power threshold value.

2. The method in accordance with claim 1 further comprising the step of:

transmitting a message report from said mobile unit, said message report operable to convey a value corresponding to received power at said first frequency and a value corresponding to each active pilot channel's fractional total power at said first frequency.

3. The method in accordance with claim 1 further comprising the step of:

comparing a received power at said new frequency to a new frequency received power threshold value, wherein said mobile unit tunes to said first frequency when said received power at said new frequency is less than said new frequency received power threshold value.

4. The method in accordance with claim 3 further comprising the step of:

performing a hysteresis check when said received power at said new frequency is greater than said new frequency received power threshold value.

5. The method in accordance with claim 4 wherein said hysteresis check is accomplished by comparing a differential value between said received power at said new frequency and said received power at said first frequency with a hysteresis threshold value.

6. The method in accordance with claim 5 further comprising the step of:

tuning to said first frequency when said differential value between said received power at said new frequency and said received power at said first frequency is less than said hysteresis threshold value.

7. The method in accordance with claim 6 further comprising the step of:

transmitting a message report from said mobile unit, said message report operable to convey:

a value corresponding to said received power at said first frequency, a value corresponding to said received power at said new frequency, and a value corresponding to at least one active pilot channel's fractional total power at said first frequency.

8. The method in accordance with claim 5 further comprising the step of:

performing an inter-frequency hand-off to said new frequency when said differential value between said received power at said new frequency and said received power at said first frequency is greater than said hysteresis threshold value.

9. The method in accordance with claim 8 further comprising the step of:

transmitting a message report from said mobile unit, said message report operable to convey:

a value corresponding to said received power at said first frequency, a value corresponding to said received power at said new frequency, a value corresponding to at least one active pilot channel's fractional total power at said first frequency, and a value corresponding to at least one active pilot channel's fractional total power at said new frequency.

10. The method in accordance with claim 1 wherein said wireless communication system is a CDMA based system.

11. The method in accordance with claim 1 further comprising the step of:

performing a hysteresis check when a received power at said new frequency is greater than a new frequency received power threshold value.

12. The method in accordance with claim 11 wherein said hysteresis check is accomplished by comparing a differential value between said received power at said new frequency and said received power at said first frequency with a hysteresis threshold value.

13. The method in accordance with claim 12 further comprising the step of:

tuning to said first frequency when said differential value between said received power at said new frequency and said received power at said first frequency is less than said hysteresis threshold value.

14. The method in accordance with claim 13 further comprising the step of:

transmitting a message report from said mobile unit, said message report operable to convey:
a value corresponding to said received power at said first frequency,
a value corresponding to said received power at said new frequency, and
a value corresponding to at least one active pilot channel's fractional total power at said first frequency.

15. The method in accordance with claim 12 further comprising the step of:

performing an inter-frequency hand-off to said new frequency when said differential value between said received power at said new frequency and said received power at said first frequency is greater than said hysteresis threshold value.

16. The method in accordance with claim 15 further comprising the step of:

transmitting a message report from said mobile unit, said message report operable to convey:
a value corresponding to said received power at said first frequency,
a value corresponding to said received power at said new frequency,
a value corresponding to at least one active pilot channel's fractional total power at said first frequency, and
a value corresponding to at least one active pilot channel's fractional total power at said new frequency.

17. In a wireless CDMA based communication system having a base station in communication with a mobile unit at a first frequency, a method for inter-frequency hand-off of a connected call to a new frequency, said method comprising the steps of:

receiving a trigger message at said mobile unit, said trigger message representing a request for said mobile unit to enable periodic searching and tuning at said new frequency;

comparing a received power at said first frequency to a received power threshold value; and tuning to said new frequency to explore said new frequency for a potential hand-off opportunity when said received power at said first frequency is less than said received power threshold value wherein said connected call is continued at said first frequency when said received power at said first frequency is greater than said received power threshold value;

comparing a summation of active pilot channels' fractional total power to a pilot power threshold value for said continued connected call, wherein said mobile unit continues said connected call at said first frequency when said summation of active pilot channels' fractional total power is greater than said pilot power threshold value; and tuning to said new frequency to explore said new frequency for a potential hand-off opportunity when said received power at said first frequency is less than said received power threshold value or said summation of active pilot channels' fractional total power is less than said pilot power threshold value.

18. The method in accordance with claim 17 further comprising the step of:

transmitting a message report from said mobile unit, said message report operable to convey a value corresponding to received power at said first frequency and a value corresponding to each active pilot channel's fractional total power at said first frequency.

19. The method in accordance with claim 17 further comprising the step of:

comparing a received power at said new frequency to a new frequency received power threshold value, wherein said mobile unit tunes to said first frequency when said received power at said new frequency is less than said new frequency received power threshold value.

20. The method in accordance with claim 19 further comprising the step of:

performing a hysteresis check when said received power at said new frequency is greater than said new frequency received power threshold value.

21. The method in accordance with claim 20 wherein said hysteresis check is accomplished by comparing a differential value between said received power at said new frequency and said received power at said first frequency with a hysteresis threshold value.

22. The method in accordance with claim 21 further comprising the step of:

tuning to said first frequency when said differential value between said received power at said new frequency and said received power at said first frequency is less than said hysteresis threshold value.

23. The method in accordance with claim 22 further comprising the step of:

transmitting a message report from said mobile unit, said message report operable to convey:
a value corresponding to said received power at said first frequency,
a value corresponding to said received power at said new frequency, and
a value corresponding to at least one active pilot channel's fractional total power at said first frequency.

24. The method in accordance with claim 21 further comprising the step of:
  performing an inter-frequency hand-off to said new frequency when said differential value between said received power at said new frequency and said received power at said first frequency is greater than said hysteresis threshold value.

25. The method in accordance with claim 24 further comprising the step of:
  transmitting a message report from said mobile unit, said message report operable to convey
    a value corresponding to said received power at said first frequency,
    a value corresponding to said received power at said new frequency,
    a value corresponding to said at least one active pilot channel's fractional total power at said first frequency, and
    a value corresponding to at least one active pilot channel's fractional total power at said new frequency.

26. In a wireless communication system having a base station in communication with a mobile unit at a first frequency, a device for an inter-frequency hand-off of a connected call to a new frequency incorporated within said mobile unit, said device comprising:
  a first comparator for comparing a received power at said first frequency to a received power threshold value; and
  a frequency tuner for tuning said mobile unit to said new frequency to explore said new frequency for a potential hand-off opportunity when said received power at said first frequency is less than said received power threshold value wherein said connected call is continued at said first frequency when said received power at said first frequency is greater than said received power threshold value; and
  a second comparator for comparing a summation of active pilot channels' fractional total power to a pilot power threshold value, wherein said mobile unit continues said connected call at said first frequency when said summation of active pilot channels' fractional total power is greater than said pilot power threshold value, wherein said mobile unit tunes to said new frequency to explore said new frequency for a potential hand-off opportunity when said received power at said first frequency is less than said received power threshold value or said summation of active pilot channels' fractional total power is less than said pilot power threshold value.

27. The device in accordance with claim 26 wherein said mobile unit transmits a message report, said message report operable to convey a value corresponding to received power at said first frequency and a value corresponding to each active pilot channel's fractional total power at said first frequency.

28. The device in accordance with claim 26 further comprising:
  a comparator for comparing a received power at said new frequency to a new frequency received power threshold value, wherein said mobile unit tunes to said first frequency when said received power at said new frequency is less than said new frequency received power threshold value.

29. The device in accordance with claim 28 wherein a hysteresis check is performed when said received power at said new frequency is greater than said new frequency received power threshold value.

30. The device in accordance with claim 29 wherein said hysteresis check is accomplished by comparing a differential value between said received power at said new frequency and said received power at said first frequency with a hysteresis threshold value.

31. The device in accordance with claim 30 wherein said mobile unit tunes to said first frequency when said differential value between said received power at said new frequency and said received power at said first frequency is less than said hysteresis threshold value.

32. The device in accordance with claim 31 wherein a message report is transmitted from said mobile unit, said message report operable to convey:
  a value corresponding to said received power at said first frequency,
  a value corresponding to said received power at said new frequency, and
  a value corresponding to at least one active pilot channel's fractional total power at said first frequency.

33. The device in accordance with claim 30 wherein an inter-frequency hand-off to said new frequency is performed when said differential value between said received power at said new frequency and said received power at said first frequency is greater than said hysteresis threshold value.

34. The device in accordance with claim 33 wherein a message report is transmitted from said mobile unit, said message report operable to convey:
  a value corresponding to said received power at said first frequency,
  a value corresponding to said received power at said new frequency,
  a value corresponding to said at least one active pilot channel's fractional total power at said first frequency, and
  a value corresponding to at least one active pilot channel's fractional total power at said new frequency.

35. The device in accordance with claim 26 wherein said wireless communication system is a CDMA based system.

36. In a wireless CDMA based communication system having a base station in communication with a mobile unit at a first frequency, a method for inter-frequency hand-off of a connected call to a new frequency, said method comprising the steps of:
  receiving a General Handoff Direction Message (GHDM) at said mobile unit, said GHDM being a trigger message causing said mobile unit to enable periodic searching and tuning at said new frequency;
  comparing a received power at said first frequency to a SF_RX_PWR_THRESH value, said SF_RX_PWR_THRESH value being a received power threshold value; and
  tuning to said new frequency to explore said new frequency for a potential hand-off opportunity when said received power at said first frequency is less than said SF_RX_PWR_THRESH value wherein said connected call is continued at said first frequency when said received power at said first frequency is greater than said SF_RX_PWR_THRESH values;
  comparing a summation of active pilot channels' fractional total power to a pilot power threshold value, wherein said mobile unit continues said connected call at said first frequency when said summation of active pilot channels' fractional total power is greater than said pilot power threshold value; and
  tuning to said new frequency to explore said new frequency for a potential hand-off opportunity when said received power at said first frequency is less than said SF_RX_PWR_THRESH value or said summation of active pilot channels' fractional total power is less than said pilot power threshold value.

37. The method in accordance with claim 36 further comprising the step of:
transmitting a Candidate Frequency Search Report Message (CFSREPM) from said mobile unit, said CFSREPM operable to convey a value corresponding to received power at said first frequency and a value corresponding to each active pilot channel's fractional total power at said first frequency.

38. The method in accordance with claim 36 further comprising the step of:
comparing a received power at said new frequency to a CF_RX_PWR_THRESH value, said CF_RX_PWR_THRESH value being a new frequency received power threshold value, wherein said mobile unit tunes to said first frequency when said received power at said new frequency is less than said CF_RX_PWR_THRESH value.

39. The method in accordance with claim 38 further comprising the step of:
performing a hysteresis check when said received power at said new frequency is greater than said CF_RX_PWR_THRESH value.

40. The method in accordance with claim 39 wherein said hysteresis check is accomplished by comparing a differential value between said received power at said new frequency and said received power at said first frequency with a DIFF_RX_PWR_THRESH value, said DIFF_RX_PWR_THRESH value being hysteresis threshold value.

41. The method in accordance with claim 40 further comprising the step of:
tuning to said first frequency when said differential value between said received power at said new frequency and said received power at said first frequency is less than said DIFF_RX_PWR_THRESH value.

42. The method in accordance with claim 41 further comprising the step of:
transmitting a Candidate Frequency Search Report Message (CFSREPM) from said mobile unit, said CFSREPM operable to convey:
a value corresponding to said received power at said first frequency,
a value corresponding to said received power at said new frequency, and
a value corresponding to at least one active pilot channel's fractional total power at said first frequency.

43. The method in accordance with claim 40 further comprising the step of:
performing an inter-frequency hand-off to said new frequency when said differential value between said received power at said new frequency and said received power at said first frequency is greater than said DIFF_RX_PWR_THRESH value.

44. The method in accordance with claim 43 further comprising the step of:
transmitting a Candidate Frequency Search Report Message (CFSREPM) from said mobile unit, said CFSREPM operable to convey:
a value corresponding to said received power at said first frequency,
a value corresponding to said received power at said new frequency,
a value corresponding to said at least one active pilot channel's fractional total power at said first frequency, and
a value corresponding to at least one active pilot channel's fractional total power at said new frequency.

45. In a wireless communication system having a plurality of base stations including an active set of base stations using a first frequency for communicating with a mobile unit, a method for inter-frequency hand-off from the first frequency to a second frequency, the method comprising the steps of:
comparing a first received power at the mobile unit for signals transmitted by base stations in the wireless communication system using the first frequency to a first received power threshold value; and
tuning the mobile unit to the second frequency to measure a second received power for signals transmitted by base stations using the second frequency when the first received power at the first frequency is not greater than the first received power threshold value;
comparing a summation of received powers at the mobile unit for signals transmitted by the active set base stations using the first frequency to a second received power threshold value when the first received power is greater than the first received power threshold value; wherein the mobile unit maintains communication with the active set base stations when the summation of received powers is greater than the second received power threshold value; and
tuning to the second frequency to measure the second received power for signals transmitted by the base stations using the second frequency when the summation of received powers is not greater than the second received power threshold value.

46. The method of claim 45, wherein the step of comparing the summation of received powers comprises the step of:
measuring received powers for pilot channel signals transmitted by the active set base stations using the first frequency.

47. The method of claim 45 comprising the additional step of:
measuring the second received power for signals transmitted by base stations using the second frequency when the mobile unit is tuned to the second frequency.

48. The method of claim 47 comprising the additional step of:
determining whether there are any active set base stations using the second frequency when the received power difference value is greater than the hysteresis threshold value.

49. The method of claim 45 comprising the additional step of:
comparing a received power difference value to a hysteresis threshold value, the received power difference value being a difference between the second received power and the first received power.

50. The method of claim 49 comprising the additional step of:
tuning the mobile unit to the frequency when the received power difference value is not greater than the hysteresis threshold value.

* * * * *